(No Model.)
E. P. KELSEY.
HARDENING AND TOUGHENING GLASS.
No. 342,260. Patented May 18, 1886.
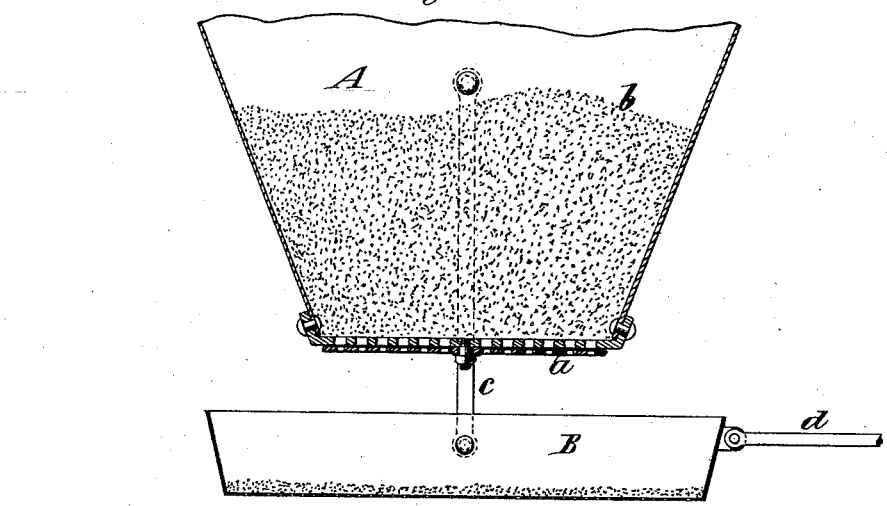
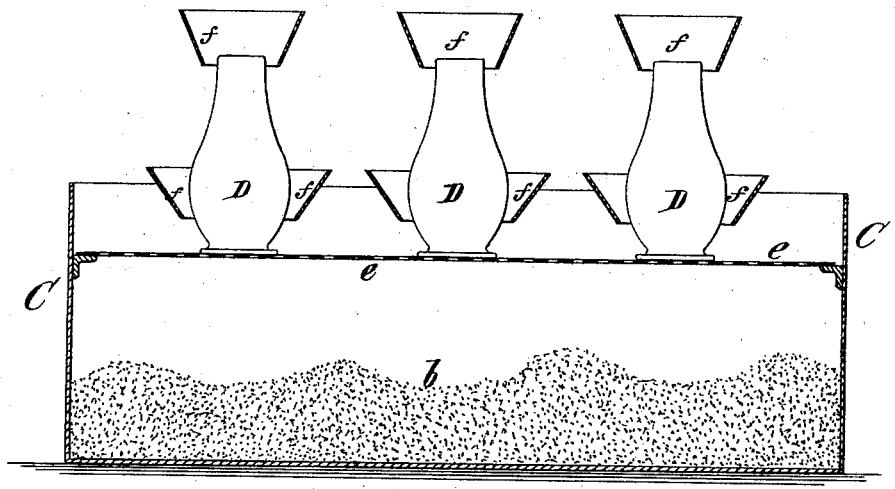
Witnesses:
C. Sundgren
Emil Herter.
Inventor:
Edward P. Kelsey
by his Attys
Brown & Hall

UNITED STATES PATENT OFFICE.

EDWARD P. KELSEY, OF JERSEY CITY, ASSIGNOR TO WALTER C. HARLOW, OF BRICK CHURCH, NEW JERSEY.

HARDENING AND TOUGHENING GLASS.

SPECIFICATION forming part of Letters Patent No. 342,260, dated May 18, 1886.

Application filed August 22, 1885. Serial No. 175,061. (No specimens.)

*To all whom it may concern:*

Be it known that I, EDWARD P. KELSEY, of Jersey City, in the county of Hudson and State of New Jersey, have invented a new and useful Improvement in the Art of Hardening and Toughening Glass, by which I am able to produce glassware that will be much stronger and tougher than such as has been heretofore produced, and at a very slight cost, of which the following is a specification.

My invention relates to the treatment to which articles of glass are subjected in order to harden, temper, anneal, or toughen them and deprive them of their fragile character.

In carrying out my invention, I take the glass either directly from the furnace or mold, or I reheat the same after having been blown or molded, so that it will be at a high degree of heat at or near to but below the point at which it would become plastic and lose its shape, and it must then be cooled throughout as uniformly and rapidly as possible. The degree of hardness or toughness of the glass will depend largely on the rapidity with which the cooling is effected and the extent to which the cooling is carried. The loss by breakage, which has always heretofore been a serious one, becomes less according to the uniformity with which the glass is cooled or robbed of its heat.

Various methods have been employed for withdrawing or absorbing the heat from the heated glass to partially cool it. In some cases the glass when very hot has been plunged into oil or melted fat at a temperature of from 150° to 158° Fahrenheit, and has thereby been cooled and tempered or hardened in a partial degree; but in practicing this method the loss by breakage is very considerable, and the temperature to which the glass is reduced is not as low as is necessary to effect the desired result in the highest degree.

The object of my invention is to enable the heat to be withdrawn uniformly and rapidly from the hot glass until the glass has been reduced in temperature to or nearly to the temperature of the surrounding atmosphere, whereby the hardening, tempering, and toughening may be accomplished in the highest degree and with but very little loss by breakage.

My improvement in the art of hardening and toughening glass consists in applying to the highly-heated glass sand, metal filings, or any other granular, pulverulent, or finely-divided substance, which by contact therewith will absorb heat from the glass and uniformly and rapidly cool the same.

In carrying out my invention I bring the heat-absorbing particles into contact with the glass and remove them therefrom rapidly as they become heated. The best and simplest way of accomplishing this is to shower or spray the cooling substances upon the glass, whereby the particles are enabled to absorb or take up what heat they may by the contact, and then pass away from the glass as they become heated, and other particles quickly succeed them, and thereby the heat is rapidly and constantly reduced. The best results are obtained when the cooling substances are applied uniformly relative to the thickness of the glass at different parts of the structure to be cooled, so that in the same space of time a larger quantity of the cooling substances should be applied to the thick parts of the glass than to the thinner portions.

My invention may be carried out with apparatus of various forms and constructions.

The accompanying drawings represent in sectional elevation, in Figures 1 and 2, a simple form of apparatus which may be employed for lamp-chimneys and many other articles.

I have represented a hopper, A, into which the granular or pulverulent substance may be delivered by an elevator or otherwise, and at the bottom of which is a valve or gate, *a*, which by turning it will control the escape of the substance *b* from the hopper.

B designates a sieve having any suitable fineness of mesh, and which is suspended by hangers *c*. A shaking motion may be given the sieve by means of a rod, *d*, operated by a crank or other suitable mechanism, or by hand. Below the sieve is a receptacle or box, C, having a false perforated bottom, *e*, on which lamp-chimneys D or other glass articles may be placed, and through which the substance *b* will escape to the bottom of the box C after making contact with the chimneys.

Lamp-chimneys commonly have a greater thickness at the two ends than at the swelled portion, and I have represented a system of deflectors, $f$, within which the chimneys D may be placed, and by which the granular or pulverulent material will be distributed in greater quantity at the thicker top and bottom of the chimney than at the thinner swelled portion or bulb thereof.

The articles of glass to be operated on are first heated to the required degree in any furnace, kiln, or in any other suitable manner; but I prefer to employ radiant heat for this purpose, as it is less likely to injure the surface of the glass, and will heat it in a more uniform and equal manner.

The granular, pulverulent, or other finely-divided substance I use in a cool or nearly cool state—that is to say, at or about the same temperature as the surrounding atmosphere—and as it is delivered over the article in an even shower each particle, by making contact with the glass, absorbs a unit or portion of heat therefrom, and then passes away from the glass and gives up its heat to the air.

In cases where metal filings are used, or other substances which are good conductors of heat, it is not imperative that the cooling particle should be so quickly removed, as the particles will communicate the heat to each other, and will thus cause a rapid cooling of the glass to take place; but I have found that the best results are obtained in allowing them to fall away rapidly from the glass.

Where glass is to be only slightly tempered, it is not necessary to raise it to so high a temperature, nor is it necessary to withdraw the heat in so short a time.

What I claim as my invention, and desire to secure by Letters Patent, is—

1. The improvement in the art of hardening and toughening glass, consisting in applying to the highly-heated glass any granular, pulverulent, or other finely-divided substances in a cool state, which by contact with the glass will withdraw heat therefrom, substantially as and for the purpose herein described.

2. The improvement in the art of hardening and toughening glass, consisting in showering upon the highly-heated glass granular, pulverulent, or other finely-divided substances, substantially as herein described.

3. The improvement in the art of hardening and toughening glass, consisting in showering upon the highly-heated glass granular, pulverulent, or other finely-divided substances, and allowing such substances to pass away from the glass after making contact therewith, substantially as herein described.

EDWARD P. KELSEY.

Witnesses:
C. HALL,
MINER LINDEMAN.